(12) United States Patent
Guenther et al.

(10) Patent No.: US 6,438,226 B1
(45) Date of Patent: Aug. 20, 2002

(54) XDSL SPLITTER ASSEMBLY FOR MAIN DISTRIBUTION FRAME

(75) Inventors: Andreas Guenther, Fort Worth; Barry G. Slotnick, Plano; Casimir Cwirzen, Colleyville, all of TX (US)

(73) Assignee: CCS Holdings, Inc., Hickory, NC (US)

( * ) Notice: Subject to any disclaimer, the term of this patent is extended or adjusted under 35 U.S.C. 154(b) by 0 days.

(21) Appl. No.: 08/944,333

(22) Filed: Oct. 6, 1997

(51) Int. Cl.[7] .................................................. H04Q 1/14
(52) U.S. Cl. .............................. 379/413.04; 379/93.05; 370/327
(58) Field of Search ................................ 379/399, 327, 379/93.05, 399.01, 413.02, 413.03, 413.04

(56) References Cited

U.S. PATENT DOCUMENTS

| | | | | |
|---|---|---|---|---|
| 3,801,873 A | * | 4/1974 | Stumpf et al. .............. 361/831 |
| 3,904,936 A | * | 9/1975 | Hamrick, Jr. et al. ....... 361/826 |
| 3,947,732 A | * | 3/1976 | Cwirzen ..................... 361/826 |
| 4,763,226 A | | 8/1988 | Pelletier ..................... 361/823 |
| 4,766,521 A | | 8/1988 | Pelletier ..................... 361/823 |
| 4,901,202 A | * | 2/1990 | Leschinger ................. 361/724 |
| 4,903,402 A | * | 2/1990 | Norton et al. ................ 29/843 |
| 4,975,072 A | | 12/1990 | Afshar ....................... 439/131 |
| 5,408,260 A | * | 4/1995 | Arnon ........................... 348/6 |
| 5,440,335 A | * | 8/1995 | Beveridge .................... 348/13 |
| 5,451,170 A | * | 9/1995 | Suffi ........................... 439/404 |
| 5,469,495 A | * | 11/1995 | Beveridge .................... 379/56 |
| 5,555,244 A | * | 9/1996 | Gupta et al. ................ 370/379 |
| 5,668,857 A | * | 9/1997 | McHale ................... 379/93.07 |
| 5,889,856 A | * | 3/1999 | O'Toole et al. ............. 379/399 |

FOREIGN PATENT DOCUMENTS

EP          0891067 A2    1/1999    ............ H04M/3/00

OTHER PUBLICATIONS

A1000 ADSL Remote Splitter (LPFR) Installation (with Guidelines for In–home Wiring); Alcatel Telecom; A9693; 3EC 15158 AAAA TCZZA–Ed. 01.*

Maxwell, K., "Asymmetric Digital Subscriber Line: Interim Technology for the Next Forty Years", IEEE Communications Magazine, vol. 34, No. 10, Oct. 1, 1996, pp. 100–106.

* cited by examiner

*Primary Examiner*—Forester W. Isen
*Assistant Examiner*—Donald L. Storm

(57) ABSTRACT

A splitter assembly is provided that comprises a terminal block for mounting to a main distribution frame and a splitter circuit for combining/splitting POTS signals and xDSL signals onto/from a single wire pair. The terminal block is pivotally mounted to a housing and the splitter circuit is on a card that is located in the housing. The terminal block may be mounted to the same housing that contains the splitter card. The POTS line contacts, xDSL line contacts and combined line contacts of the splitter circuit are connected to respective pairs of terminals in the terminal block.

20 Claims, 8 Drawing Sheets

XDSL SPLITTER ASSEMBLY FOR MAIN DISTRIBUTION FRAME

TECHNICAL FIELD OF THE INVENTION

The present invention relates to a xDSL splitter block for mounting on a central office telecommunications main distribution frame with xDSL splitter circuits housed therein.

BACKGROUND OF THE INVENTION

ADSL (Asymmetric Digital Subscriber Line) is a modem technology that transmits multimedia and high speed data over existing twisted-pair telephones lines concurrently with Plain Old Telephone Service (POTS). VDSL is a higher speed variation of ADSL. The term xDSL will be used herein to generically refer to these different versions of transmitting additional signals over twisted pair concurrently with the POTS signal. The term "additional signals" will be used to refer to any signal other than POTS that is transmitted over the existing POTS lines. The term "combined signals" will be used to refer to both the additional signals and POTS signals combined over a line. An xDSL circuit connects an xDSL modem on each end of a twisted-pair telephone line, that is, at the "central office" (or node) and at the premises of the subscriber (or customer). The xDSL modem in the central office transmits and receives the additional signals through a "splitter" that combines the downstream (to the subscriber) additional signals onto the POTS fine or filters off the upstream (from the subscriber) POTS signals.

The terms "splitting" or "splitter" are used to refer to a circuit, for example, a low pass filter or low pass and high pass filter combination, that at least separates a POTS signal from a combined signal in the case of the example of a low pass filter and separates both the POTS and xDSL signals from the combined signal in the example of the low pass and high pass filter combination. In other words, the signal upstream from the splitter to the xDSL modem may or may not have the POTS signal filtered off since xDSL modems may incorporate high pass filters and may not be affected by or even see the POTS signals being transmitted with the xDSL signals. One reason for removing the POTS signal from the xDSL signal is to deny access to the POTS signal when the modem is controlled by someone other than the telephone company. Circuits have been developed which perform this splitting function and the structure and nature of the various splitter circuits form no part of the present invention other than the fact that they are at the intersection of three signal paths—the additional signals, POTS signals and the combined signals—and must be interconnected into an xDSL/POTS network in some manner.

Splitters are typically housed with the xDSL modems. However, there are problems with the splitter being located in the modem. For example, inefficient backtracking of wiring occurs. The POTS line cards and the main distribution frame where the cross-connect and protector functions are located are already in place in the central office. The network switches and equipment for the xDSL circuit are added somewhere in the central office and the POTS signal would have to be routed from somewhere in the existing POTS network to the xDSL modem to be combined with the addition signal and then back to the existing twisted-pair network. If the POTS signal is taken to the splitter in the modem and the modem needed to be repaired it could require interrupting the POTS service which is a life line service to the subscribers. Also, telephone companies may be required to provide access to their xDSL network to competitive carriers as part of regulatory changes. Having the splitter in the modem may make it inconvenient to provide such competitive access. Therefore a need exists for a means to better accommodate xDSL splitters in the central office to help avoid such backtracking, take the POTS signal out of the modem, and provide a better location for access to competitive carriers.

However, space in the existing central offices is often hard to find. Commonly the floor of central offices is already filled with existing main distribution frames. Therefore a need exists to be able to prevent such backtracking in a space saving manner taking into account existing hardware in the central office.

SUMMARY OF THE PRESENT INVENTION

The present invention eliminates POTS signal backtracking to the modem, preserves space, is usable with traditional wiring center organization practices and prevents POTS interruptions by providing a splitter assembly for mounting on the main distribution frame to connect the splitter circuit into the cross-connect field of the main distribution frame. In one aspect, the present invention provides a main distribution frame comprising a frame and a first array and a second array of terminal blocks mounted on the frame. The terminal blocks carry arrays of terminals with each terminal for termination of at least two wires for electrical connection thereof. A portion of the terminals of the terminal blocks of the first array are connected to a portion of the terminals of the terminal blocks of the second array by a plurality of first jumpers to create a cross-connect field. The assembly also comprises at least one splitter circuit located on the frame for combining/splitting xDSL signals and POTS signals carried over separate wire pairs onto/from a single wire pair. The circuit has a first pair of contacts for connection to a wire pair carrying the POTS signal, a second pair of contacts for connection to a wire pair carrying the xDSL signal, and a third pair of contacts for connection to a wire pair carrying the combined POTS and xDSL signals. At least one of these pairs of contacts is connected to a pair of the terminals of one of the terminal blocks.

Another aspect of the present invention provides a terminal block assembly for mounting to a main distribution frame comprising a terminal block having an array of terminals there through with each terminal for termination of two wires thereto for electrical connection thereof The assembly also comprises at least one splitter circuit for combining/splitting first and second signals onto/from a single telephone wire pair, the circuit having a first pair of contacts for carrying the first signals, a second pair of contacts for carrying the second signals, and a third pair of contacts for carrying the combined first and second signals. At least one of the pairs of contacts is connected to a pair of the terminals of the terminal block.

In a further aspect of the present invention, a splitter assembly is provided comprising a terminal block having an array of terminals therethrough with each terminal having a front end and a rear end. The array of terminals is divided into a POTS field with the front ends of the terminals for being connected to POTS lines from a central office, an xDSL field with the front ends of the terminals for being connected to xDSL lines, and a jumper field with the front ends of the terminals for being connected to jumpers. The assembly also comprises at least one xDSL splitter circuit having POTS contacts connected to the rear ends of the terminals in the POTS field, xDSL contacts connected to the rear ends of terminals in the xDSL field, and jumper contacts connected to the rear ends of the terminals in the jumper field.

The present invention eliminates POTS signal backtracking to the modem by taking the splitter out of the modem and moving it to the main distribution frame where POTS lines from the central office are cross-connected with the outside plant lines. The present invention also preserves space by being locatable on existing main distribution frames without violating clearance requirements. It is also usable with traditional wiring center organization practices and being usable with known main distribution frames and terminal blocks, craftspeople can use existing tools and procedures at a familiar location. The present invention prevents POTS interruptions that may be caused by having POTS signal taken to a modem that may need to be repaired or replaced.

DETAILED DESCRIPTION OF THE INVENTION

One aspect of the present invention provides splitter assembly 10 shown in a preferred embodiment in FIGS. 1–4 that is adapted to be mounted on main distribution frame 34 (shown in FIG. 6 with another embodiment of assembly 10' mounted thereon) and readily connected into the cross-connect arrangement of central office distribution frames.

Figure 6:
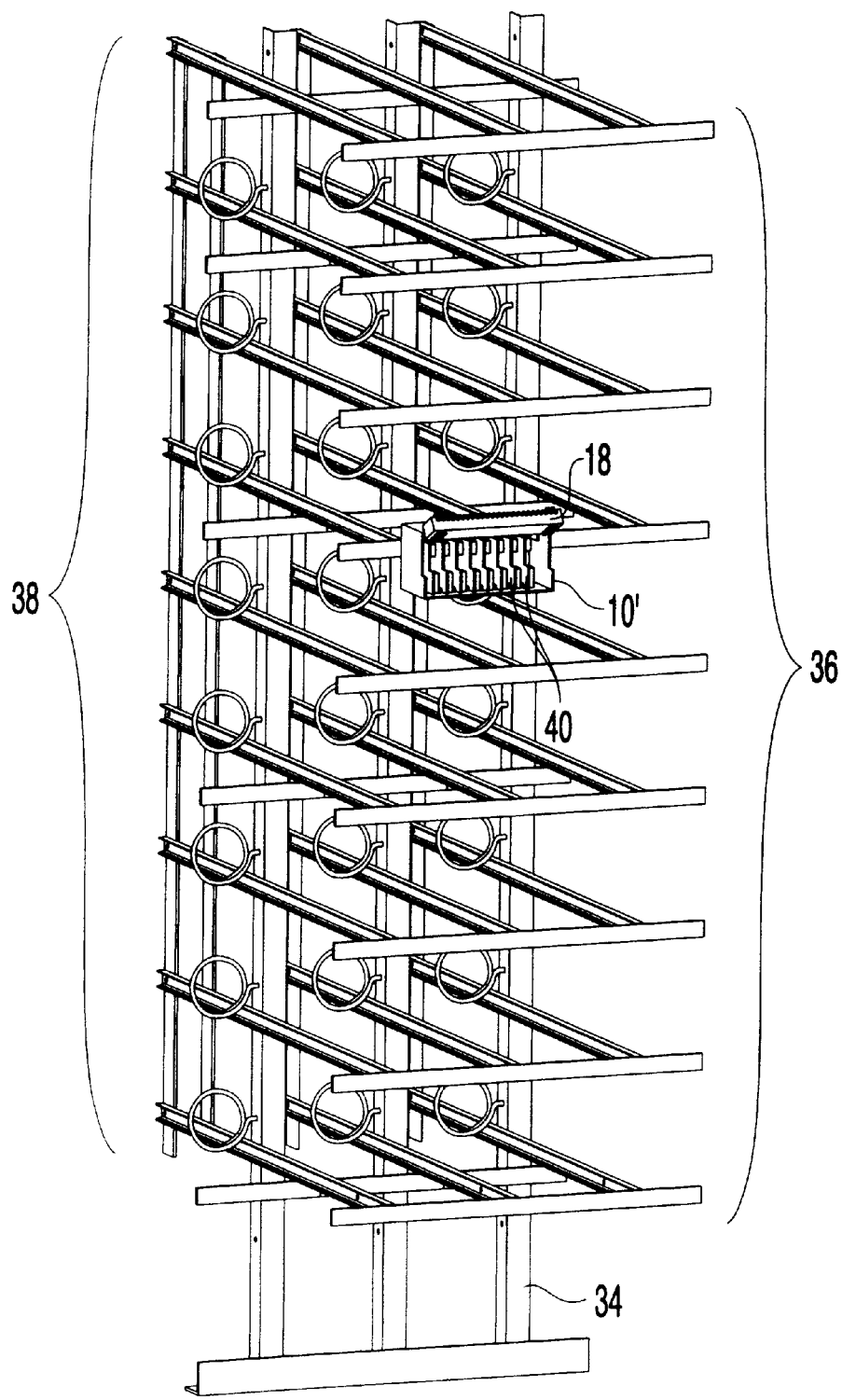
FIG. 6 is a perspective view of the assembly of FIG. 5 mounted on a distribution frame.

With reference to FIG. 6, main distribution frames are typically one of a few kinds of common formats with a first array of terminal blocks mounted in first mounting area 36 and connected between a central office cable and jumpers, and a second array of terminal blocks mounted in second mounting area 38 and connected between the jumpers and the outside plant cables. The terminal blocks in the first array of terminal blocks are typically referred to as "terminal blocks" and examples include the terminal block disclosed in U.S. Pat. Nos. 4,763,226 and 4,766,521 known as the Versablock terminal block, DF 300 terminal blocks sold by Siecor Corporation, NE 66 blocks, and rotating terminal blocks. The second array of terminal blocks are referred to as "central office connectors", "protector/connector blocks" or "protector blocks" and examples include blocks sold by Siecor corporation under numerical designations of 303, 310, 377, 388, 390, 391, and QCM486. The "connectors" often incorporate protectors and test points in addition to a block of wire terminals. To avoid confusion of terms, "terminal block" will be used herein as a generic term to include both terminal blocks, "connectors", "protector blocks" and any other type of block that is used as part of a cross-connect arrangement between two cables.

In a common architecture, the phone lines from the POTS switch are connected to the first array of terminal blocks, the phone lines from the outside plant are connected to the second array of terminal blocks, and jumpers are then connected between the first array and second array of terminal blocks to provide the cross-connect field. This cross-connect field provides a place where the outside plant lines can be rearranged relative to the central office lines. Typically there are more terminal blocks in the second array connected to outside plant than terminal blocks in the first array because outside plant lines are installed to plan for future growth while central office lines can be added more readily to track current demand. As such, there is commonly more space available-in the first mounting area than the second mounting area.

Figure 8:
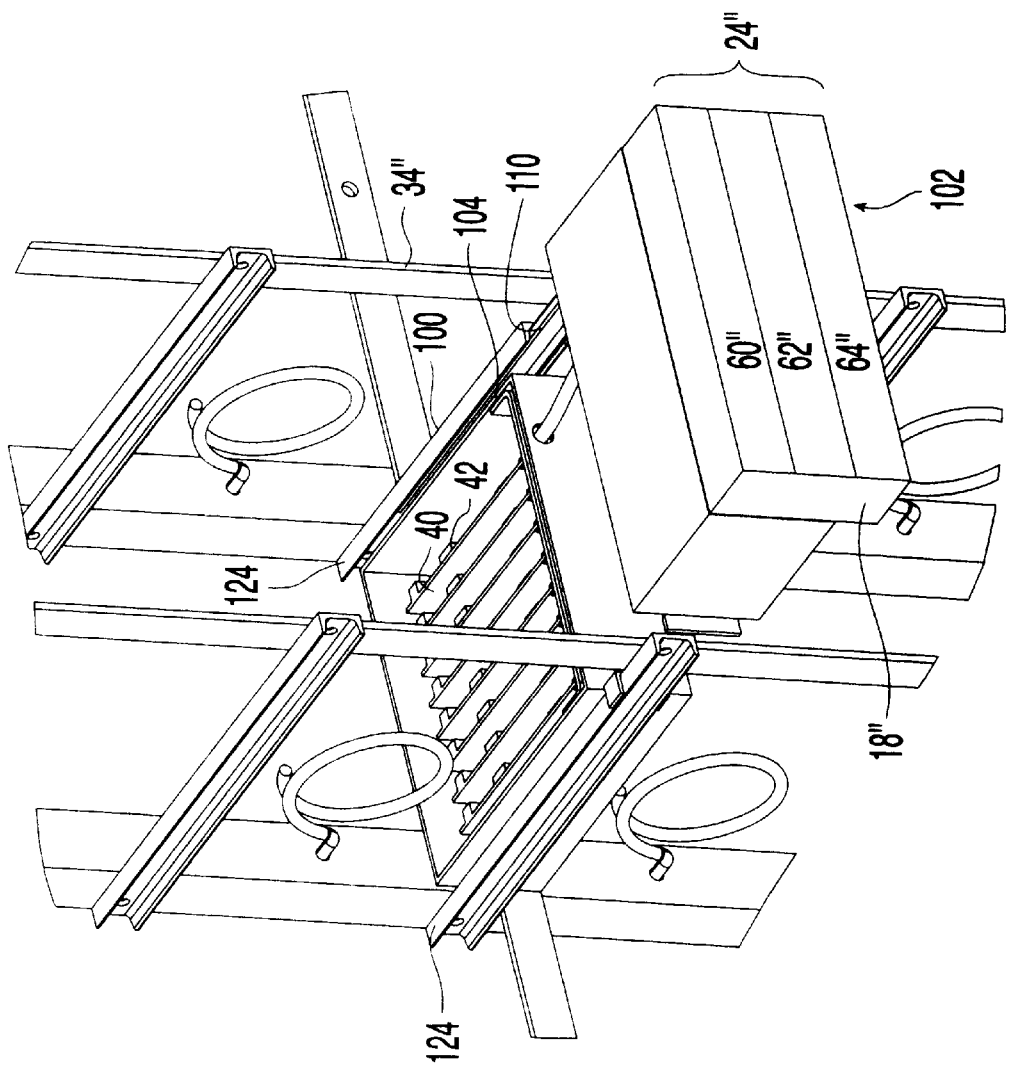
FIG. 8 is a perspective view of the assembly of FIG. 7 mounted on a distribution frame.

There are other formats for main distribution frames, for example, front facing frames (the frame partially shown in FIG. 8 is an example) where the first and second array of terminal blocks are on the same side of a frame mounted against a wall. There are also modular distribution frames that are intended to be easier to install than the traditional main distribution frames. One thing that all these frames have in common is the competing design considerations of 1) high density of terminals to save space and 2) sufficient space for craftspeople to connect wires and route jumpers. The first consideration is often addressed by increasing the density of terminals on the terminal blocks and the second consideration is often addressed by requiring certain clearances around each terminal block to allow for movement of installers' hands during connection of wires and the routing of jumpers. With some distribution frames, the height and width of the terminal blocks must be within a certain envelope so that when the terminal blocks are mounted at the various mounting locations, there are set distances between neighboring terminal blocks in the horizontal and vertical directions. The terminal block of the '521 and '226 patents is an example of a terminal block with a height and width within a set envelope and the patents deal with increasing the number of terminals in the terminal block while maintaining the height and width requirements of the housing.

With reference to FIGS. 1–4, the preferred embodiment of xDSL splitter assembly 10 of the present invention is shown. Splitter assembly 10 has housing 12 which defines interior 14 with open side 16. Terminal block 18 is pivotally attached to housing 12 and has front face 20 and rear face 22 with array 24 of terminals 26 mounted in terminal block 18 such that terminals 26 have first and second ends, for example, front ends 28 accessible at front face 20 and rear ends 30 accessible at rear face 22. Terminals 26 are for termination of at least two wires for electrical connection of the two wires. Terminals may be any of a variety of terminals, for example, wire wrap pins, insulation displacement (IDC) pins, pins for soldering, connectors or other kind of electrical contact. Terminal block 18 can be closed over open side 16 and pivoted away from open side 16 to allow access to rear face 22 of terminal block 18 as well as interior 14 of housing 12. In the preferred embodiment, terminal block 18 and the outer structure of housing 12 and the mounting and latching features of terminal block 18 to housing 12 are substantially those of the terminal block disclosed in U.S. Pat. Nos. 4,766,521 and 4,763,226 to Pelletier and more specifically the current commercial embodiment of the block disclosed in these patents sold by Siecor Corporation under the trademark Versablock. Accordingly, the '521 and '226 patents are incorporated herein by reference for further explanation of the terminal block 18 and its cooperation with housing 12.

As discussed above there are a variety of distribution frames 34 commercially available and they all generally serve the function of providing a cross-connect field between two groups of cables, for example, the telephone company central office cables and the outside plant telephone cables. As disclosed in the '521 and '226 patents, the terminal block provides a cross-connect field where a cable is terminated on rear ends 30 of terminals 26 at rear face 22 of the terminal block and cross-connect jumpers are connected to front ends 28 of terminals 26 on front face 20 of the terminal block. As is known in the art of distribution frames, some of the terminals of the terminal blocks in the first array are connected to some of the terminals of the terminal blocks of the second array by a plurality of jumpers to create a cross-connect field whereby rearrangement of the telephone network lines can be achieved by simply rearranging the jumpers. By having the jumpers attached to the front faces of the blocks, they are more accessible for any rearranging. The cables that are being cross-connected are connected on the rear faces of their respective set of blocks. As such, the entire array of terminals of the terminal block of the '521 and '226 patents is dedicated to the connection of a cable to a set of jumpers, with one face of the terminal block for termination of one of the cables to be cross-connected and the other face for termination of the jumpers.

One aspect of the present invention provides an xDSL splitter in the terminal block and divides the array of terminals into a first, second and third fields to accommodate connecting of the splitter into the cross-connect arrangement. Specifically in the preferred embodiment, interior 14 of housing 12 has cards 40 with xDSL splitter circuitry components 42 mounted thereon. Each card 40 has two opposed sliding edges 44 *a, b* that are slidably received in card guides 46 mounted in interior 14. One card 40 may have more than one xDSL splitter circuit thereon, and in the embodiment of FIGS. 1–3, two circuits are on each card. Card retainer 48 holds cards 40 in place once installed and is shown by example as flexible strip 50 with reduced cross-section ends 52 that are inserted into holes 54 in housing 12. Strip 50 is readily inserted and removed by flexing to remove ends 52 from holes 54 to allow removal of cards 40. As an alternative, strip 50 may be eliminated and retention of the cards may be provided by use of any type of snap-in feature on the card guides or the housing to hold the cards.

Figure 1:
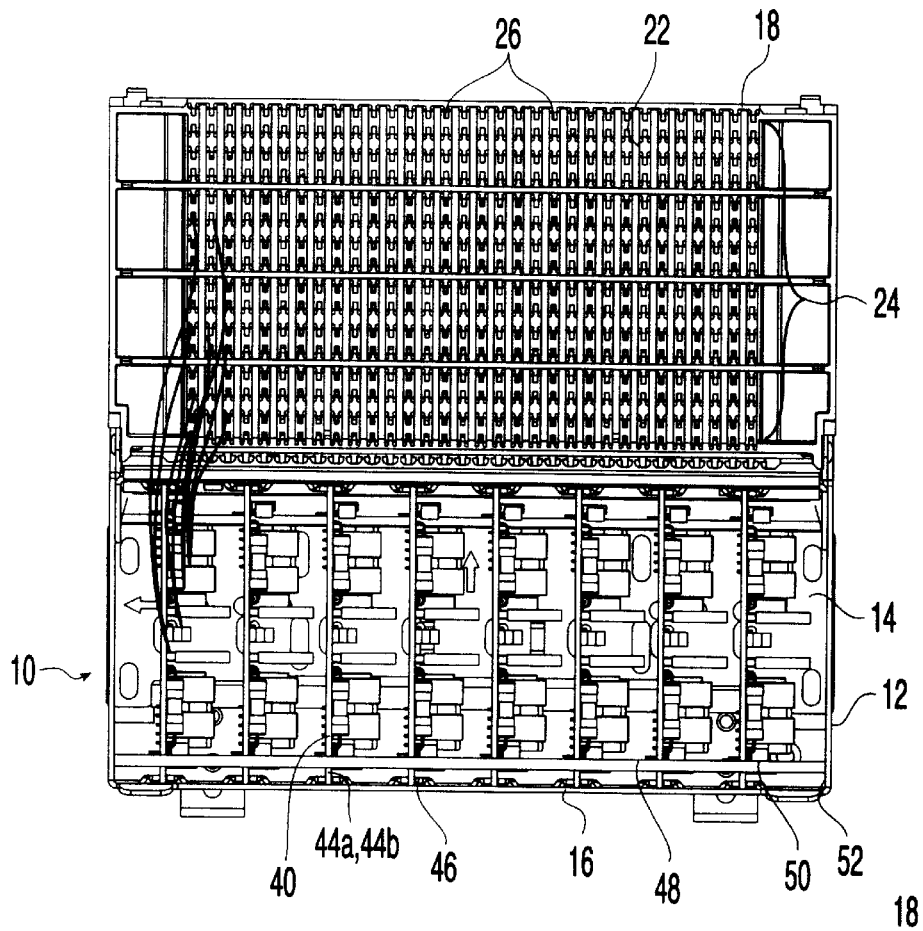
FIG. 1 is a front view of the preferred embodiment of the xDSL splitter assembly of the present invention open.
Figure 2:
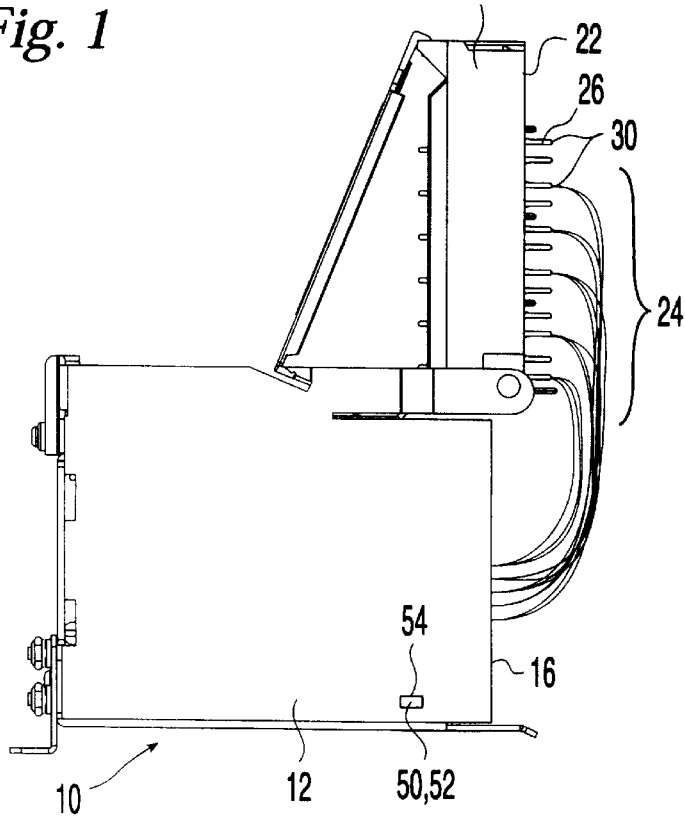
FIG. 2 is a side view of the assembly of FIG. 1 open.
Figure 3:
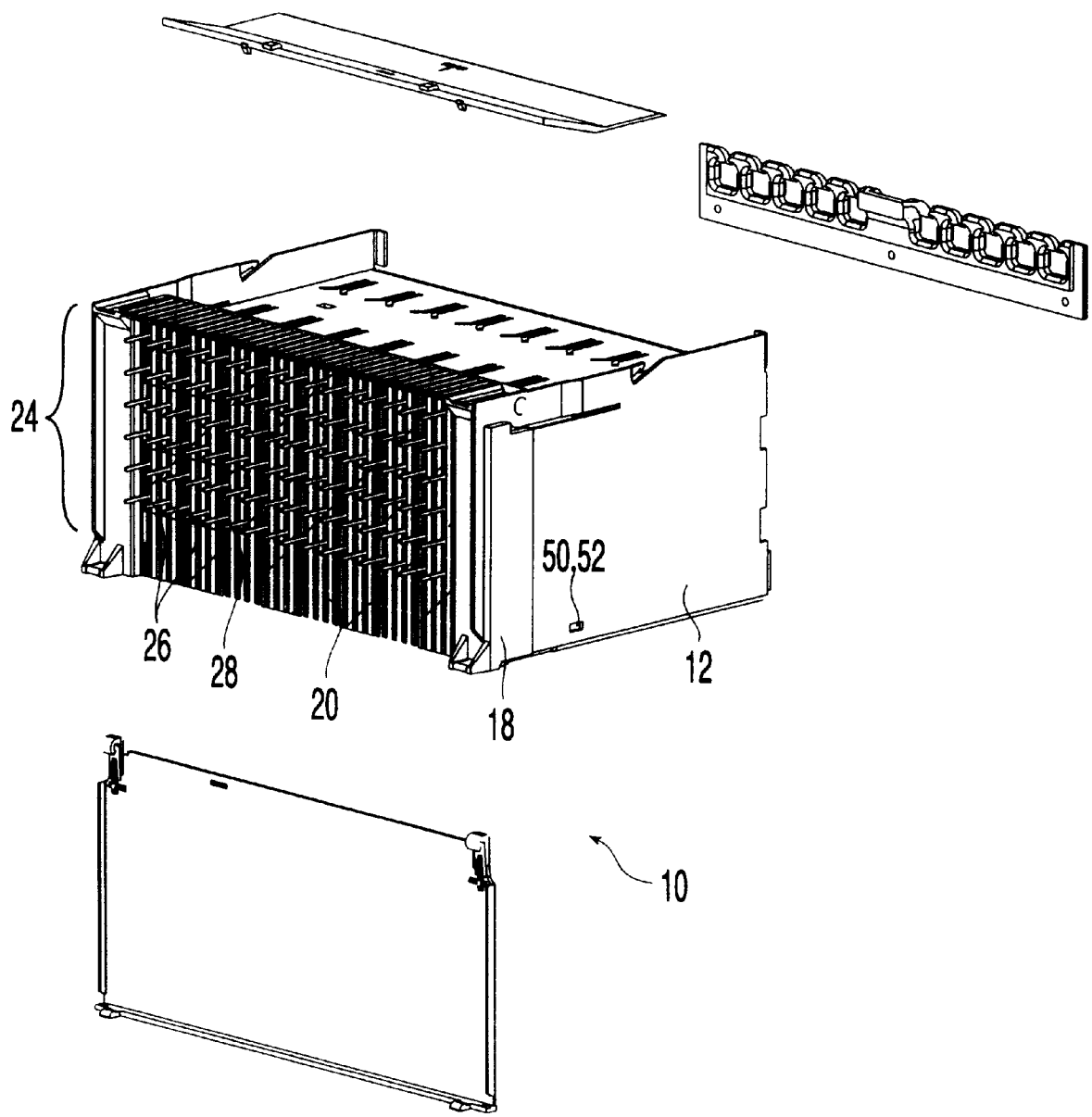
FIG. 3 is a partially exploded perspective view of the assembly of FIG. 1 closed.
Figure 4:
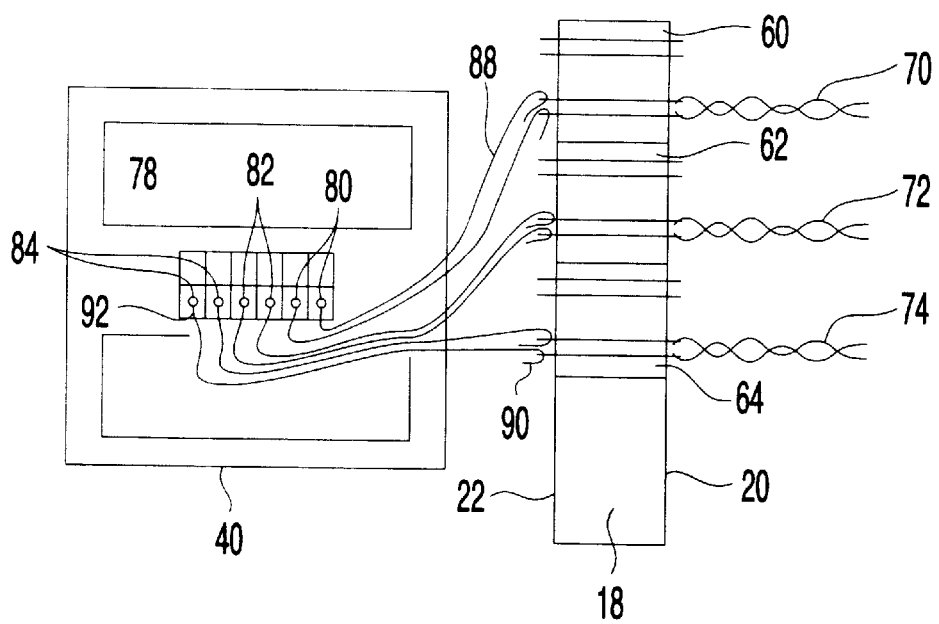
FIG. 4 is a diagram of connections for an xDSL splitter assembly of the present invention.

With further reference to the diagram of FIG. 4, the connection of the xDSL splitter circuits are shown. Array 24 of terminals 26 is divided into first, second, and third fields, for example, POTS field 60, xDSL field 62 and jumper field 64, respectively. POTS lines 70 carrying the POTS signal are connected to front ends 28 of terminals 26 in POTS field 60, xDSL lines 72 are connected to front ends 28 of terminals 26 in xDSL field 62 and jumpers 74 are connected to front ends 28 of terminals 26 in jumper field 64. The POTS lines, xDSL lines and jumpers are wire pairs. Splitter circuit 78 has a first, second, and third pair of contacts, for example, POTS contacts 80 connected to rear end 30 of a terminal in POTS field 60, xDSL contacts 82 connected to rear end 30 of a terminal in xDSL field 62, and jumper contacts 84 connected to rear end 30 of a terminal in jumper field 64.

In the embodiment of FIGS. 1–5, pairs of contacts 80, 82, and 84 are connected to rear ends 30 by wires 88 that have first end 90 connected to rear ends 30 of terminals 26 and second ends 92 connected to circuit 78 on card 40. Wires 88 allow terminal block 18 to be pivoted while maintaining the connections from the circuits to the terminals. Terminal block 18 is pivoted up to open interior 14 of housing 12 to allow insertion of the desired number of cards 40 into card guides 46 and then card retainer 48 is inserted to retain cards 40. Preferably, wires 88 are already connected at second ends 92 to cards 40 and first ends 90 of wires 88 are then connected to the respective rear ends 30 of terminals 26. Wires 88 can be connected to cards 40 in any way, for example, soldering, using a connector, insulation displacement connectors, wire wrap pins, etc. Then terminal block 18 is lowered back down and snap closed over interior 14. As assembled, assembly 10 can then be conveniently mounted to distribution frame 34 and POTS lines are connected to the front end of terminals in the POTS field, xDSL lines are connected to the front end of terminals in the xDSL field, and jumpers are connected to the front end of terminals in the jumper field.

It is preferred that assembly 10 is mounted in the first mounting area at a terminal block mounting location among the first array of conventional terminal blocks. Jumpers 74 can then preferably be routed one of two ways. First, jumpers 74 may be considered analogous to a cable to be cross-connected and routed to the rear ends of terminals in a conventional terminal block in the first array and then conventional jumpers are routed from the front of the conventional terminal block in the first array to the front faces of terminal blocks in the second array as is standard. Alternatively, jumpers 74 may be considered analogous to conventional jumpers and routed directly to the front faces of terminal blocks in the second array. The method chosen may depend on the nature of the central office network and any considerations dictated by co-location requirements that may require telephone companies to provide access points to their networks to other telephone companies.

By using a modified housing and terminal block of the '521 and '226 patents, assembly 10 has the same height and width of standard terminal blocks such as the block of the '521 and '226 patents and does not violate clearance requirements when mounted on frame 34. Assembly 10 may have a greater depth than the terminal blocks of the '521 and '226 patents if needed to better accommodate cards 40.

Figure 5:
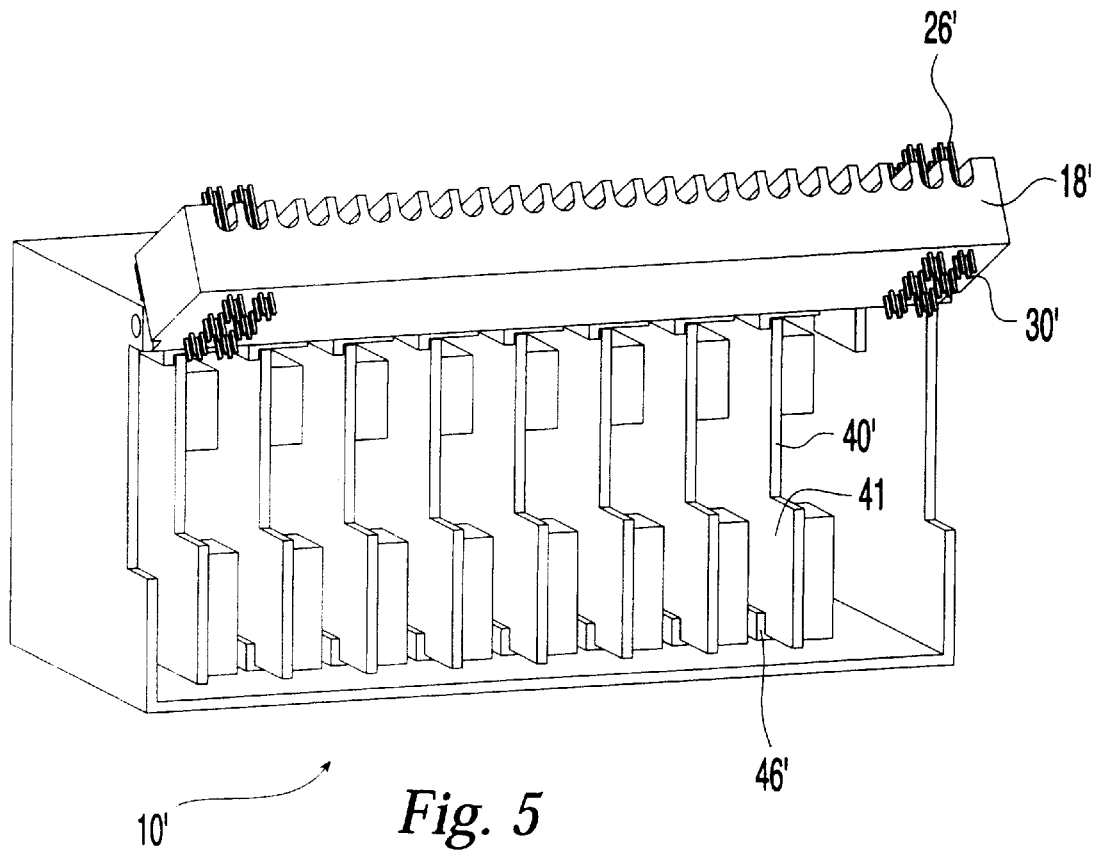
FIG. 5 is a perspective view of an alternative embodiment of an xDSL splitter assembly of the present invention.

FIG. 5 shows an alternative embodiment of assembly 10' where terminal block 18' has a reduced height such that it does not close completely over interior 14'. Due to the size of splitter circuits 78' it may be that a full size terminal block 18 is not required. Terminal block 18' in FIG. 6 has six (6) rows of terminals 26' so that each column of terminals can be connected to the six contacts of splitter circuit 78. By shortening the terminal block, additional area is provided underneath terminal block 18' for cards 40' to extend to provide additional area for circuits 78 as shown by stepped portion 41 of cards 40. Terminals 26' in this embodiment have a wire wrap pin configuration at rear end 30' and an insulation displacement configuration at front end 28'. It should be understood that the type or configuration of terminals 26 forms no part of the present invention and any suitable type or configuration may be used.

FIG. 6 shows assembly 10' mounted on frame 34. Frame 34 in this embodiment is a conventional frame where first mounting area 36 is termed the horizontal side and second mounting area 38 is termed the vertical side. By use of a housing that approximates the height and width of a conventional terminal block for the horizontal side, all clearances can be maintained around assembly 10' on the frame. As an alternative embodiment, the assembly of the present invention could be mounted on the vertical side and in such case the housing may approximate the different height and width envelope of the terminal blocks used on the vertical side.

Figure 7:
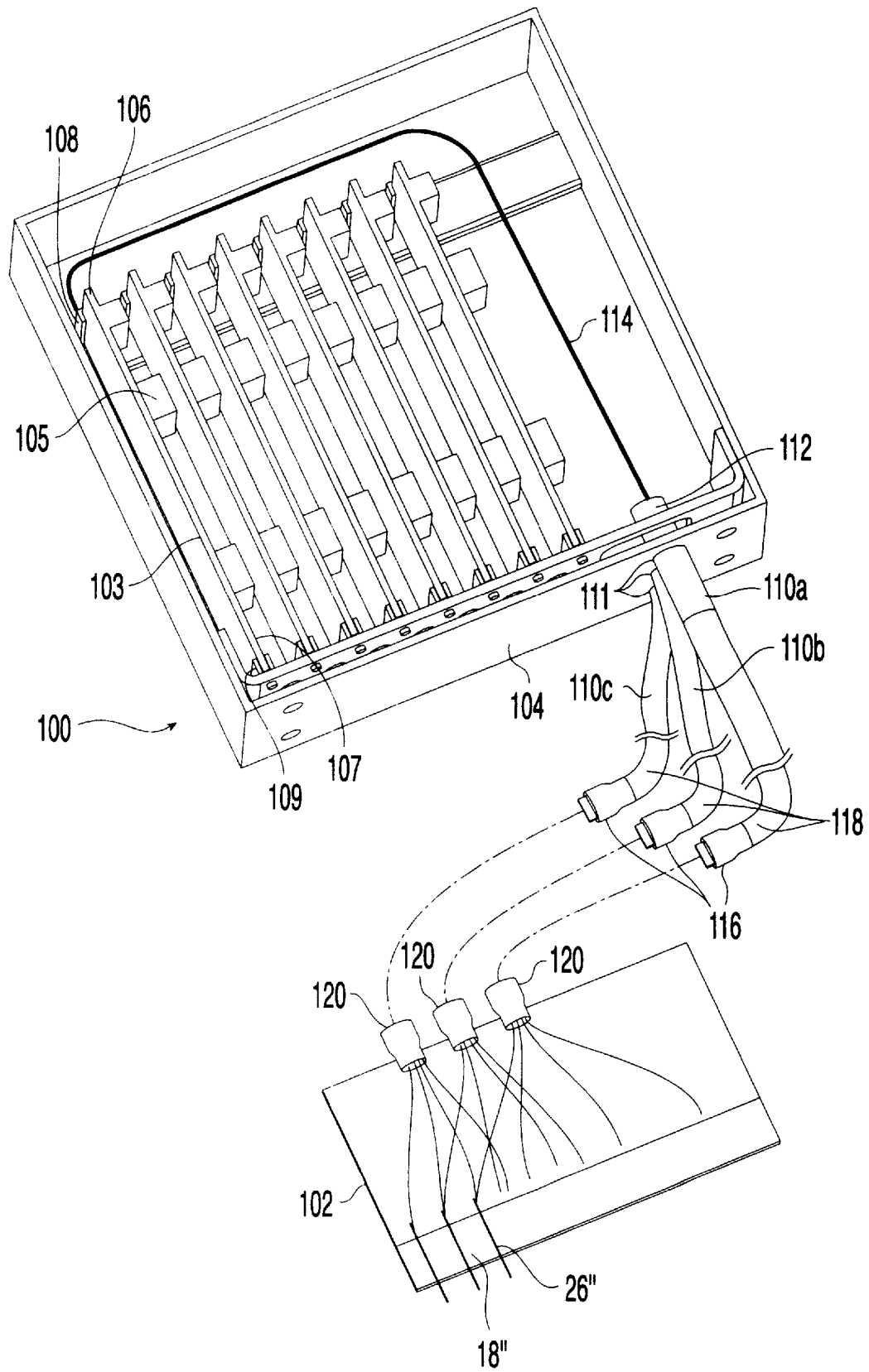
FIG. 7 is a perspective view of an alternative embodiment of an xDSL splitter assembly of the present invention.

FIGS. 7–8 show an alternative embodiment of the present invention with assembly 100 that can be mounted behind conventional terminal block assembly 102. Conventional terminal block 102 may be an unmodified Versablock terminal block. Assembly 100 has housing 104 that houses cards 103 which have xDSL circuit components 105 mounted thereon. Cards 103 have opposing edges 106, 107 that are slidably receive in card guides 108, 109, respectively. Housing 104 has three holes 111 through which three stubs 110a, b, and c which have sheaths 112 extending through holes 106 to receive wires 114 routed from contacts on cards 103.

Cards 103 preferably have two circuits with three pairs of contacts for each circuit like the cards of FIG. 4. With reference to FIG. 4 in combination with FIGS. 7–8, all of the wires 114 connected to POTS contacts 80 are routed together through stub 110a, all the wires from xDSL contacts 82 are routed together through stub 110b, and all the wires from jumper contacts 84 are routed together through stub 110c. Stubs 110a, b, and c are terminated with stub connector 16 at free end 118 of stubs 110a, b, and c. With reference to FIG. 8, conventional terminal block 102 has terminal block 18' which has POTS field 60" of terminals with front ends for connecting to POTS lines 70 as in FIG. 4, xDSL field 62 of terminals with front ends for connecting to xDSL lines 72 as in FIG. 4, and jumper field 64 of terminals 26 with front ends for connecting to jumpers 74 as in FIG. 4. The rear ends if the terminals for each field are wired to a respective block connector 120 as is known to connectorize terminal blocks. Block connectors 120 are mounted through the housing to face downwardly. As such, stub connectors 116 are readily connected to a respective block connector 120 on the rear of the conventional terminal block 102 to connect the contacts from the xDSL circuits in assembly 100 to their respective field of terminals 26" on terminal block 18" of conventional terminal block 102. As an alternative, the wires may be combined in a single stub. Also, stubs 110a, b, and c may not be connectorized and instead terminal block 18" is then pivoted up to expose rear ends of terminals 26 and wires 114 are connected to the appropriate terminals. Terminal block 18" is then pivoted to a closed position and jumpers are connected to front ends 28 of terminal 26.

With reference to FIG. 8, assembly 100 is located on frame 34 behind conventional terminal block 102 such that housing 104 does not extend beyond the height and width envelope of terminal block 102. Additionally, with the distribution frame 34" shown in FIG. 8 being a front facing frame, it has cross pieces 124 across the top of which are routed jumpers. Therefore, assembly 100 is preferably mounted flush with or below the top of cross-pieces 124. Alternatively, if the terminal blocks and main distribution frame are of the modular type or other arrangement where there is no space behind the terminal block, assembly 100 may be readily adapted to be located at any available location on the frame.

Figure 9:
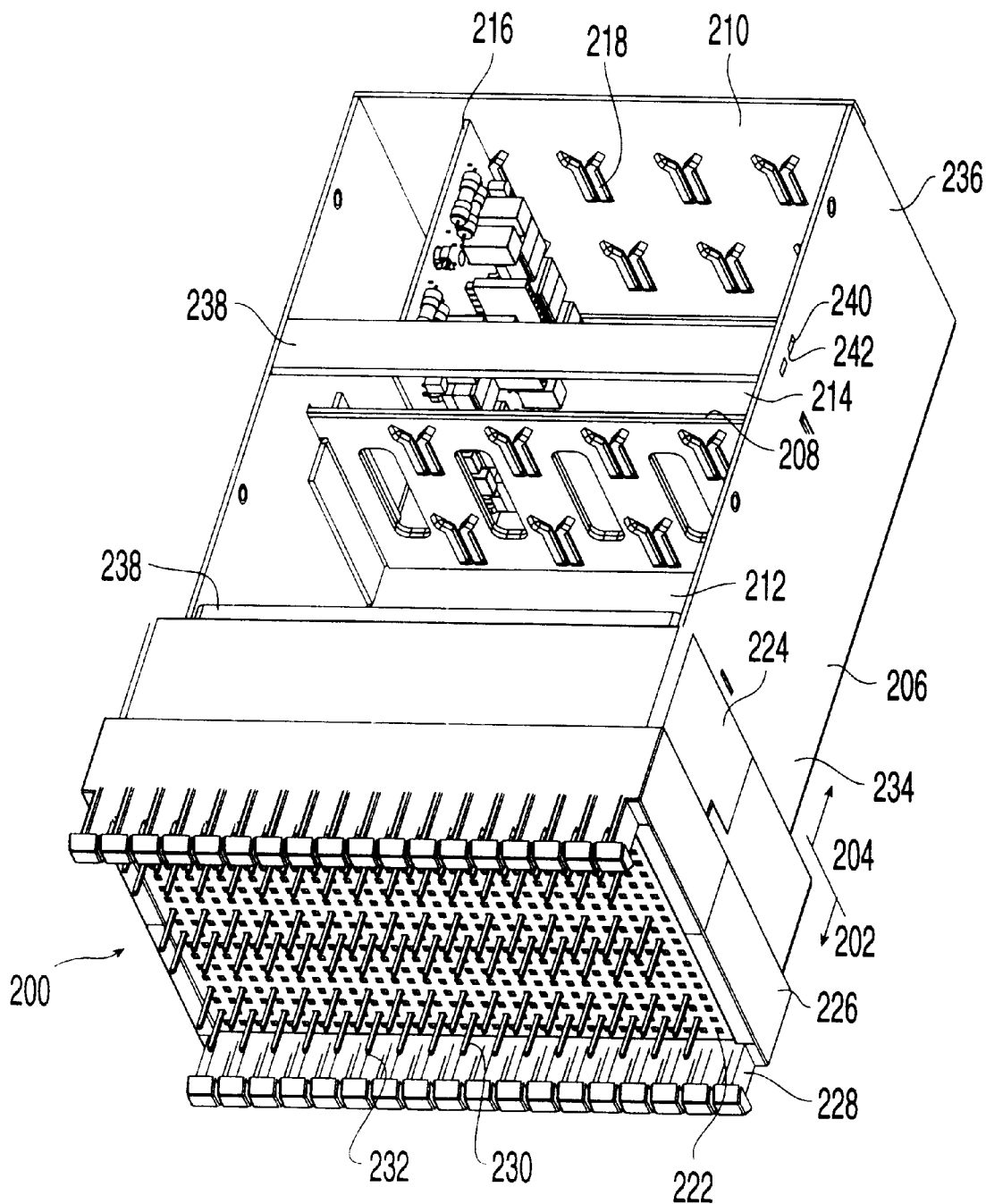
FIG. 9 is a perspective view of an alternative embodiment of an xDSL splitter assembly of the present invention with the cover exploded.

FIG. 9 shows an alternative embodiment of the present invention as assembly 200. Assembly 200 has front portion 202 which is a DF 300 terminal block available from Siecor Corporation, and rear portion 204 which has housing 206. Housing 206 has partition 208 which divides interior 210 of housing 206 into two compartments 212 and 214. Each compartment slidably receives xDSL splitter circuit cards 216 between pairs of opposed card guides 218 mounted in the compartments. Wires from cards 216 in compartment 214 are routed over partition 208 or alternatively, partition 208 has holes 220 through which wires can be routed.

Front portion 202 has terminal block 222 captures between top half 224 and bottom half 226 of shell 228. Terminal block 222 has an array of terminals 230 with front ends 232 and rear ends not visible extending rearwardly toward interior 210 of housing 206. The terminals are divided into fields and connected to the contacts of cards 216 as with the diagram of FIG. 4. Housing 206 has first end 234 that is captured in shell 228 and second end 236 opposite thereto and extending directly behind shell 228. Housing 206 does not extend beyond the height and width of shell 228 so as to not violate clearances of the DF300 distribution frame. Housing 206 has a cover not shown that closes over interior 210. Retainers 238 may be used to help retain cards 216 in housing 206. Retainers 238 have ends 240 that extend through holes 242. Retainers are sufficiently flexible to be snapped in and out of housing 206. Alternatively, the cover for housing 206 could incorporate a means of retaining cards 216.

Figure 10:
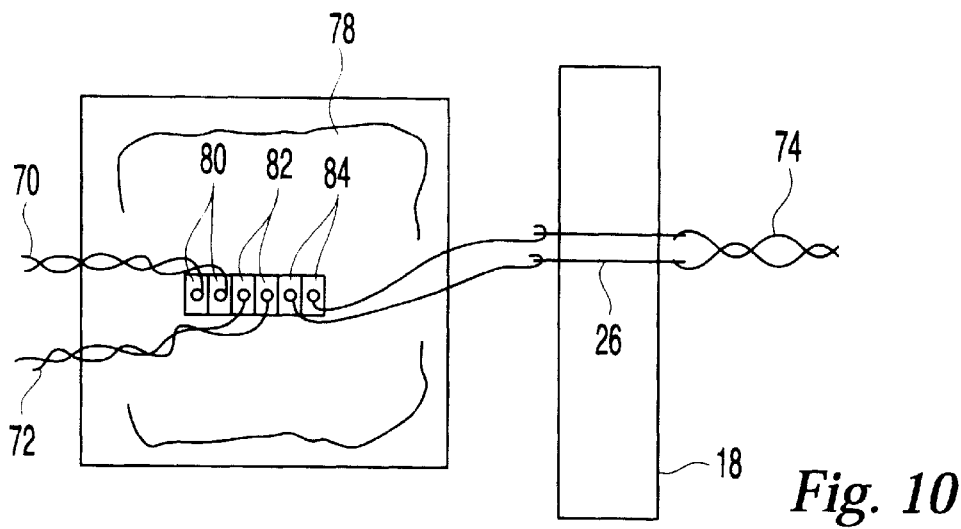
FIG. 10 is a diagram of an alternative embodiment of connections for a splitter assembly of the present invention.
Figure 11:
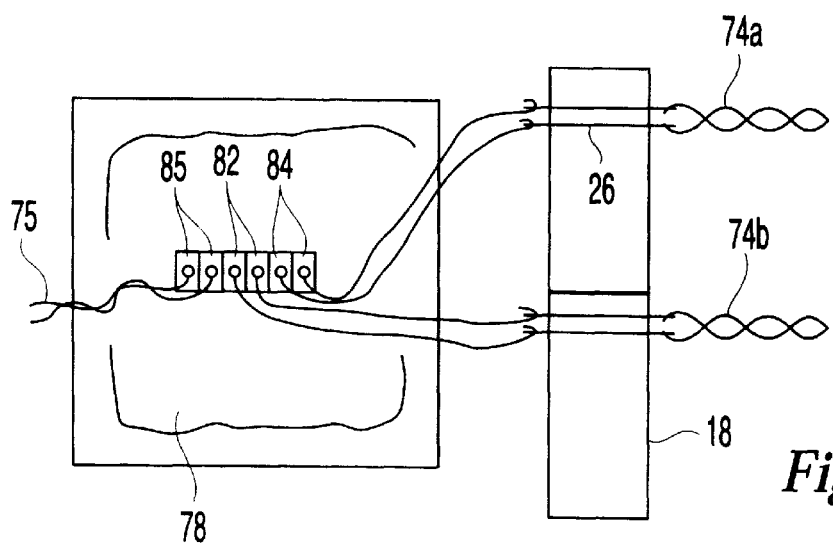
FIG. 11 is a diagram of a further alternative embodiment of connections for a splitter assembly of the present invention.
Figure 12:
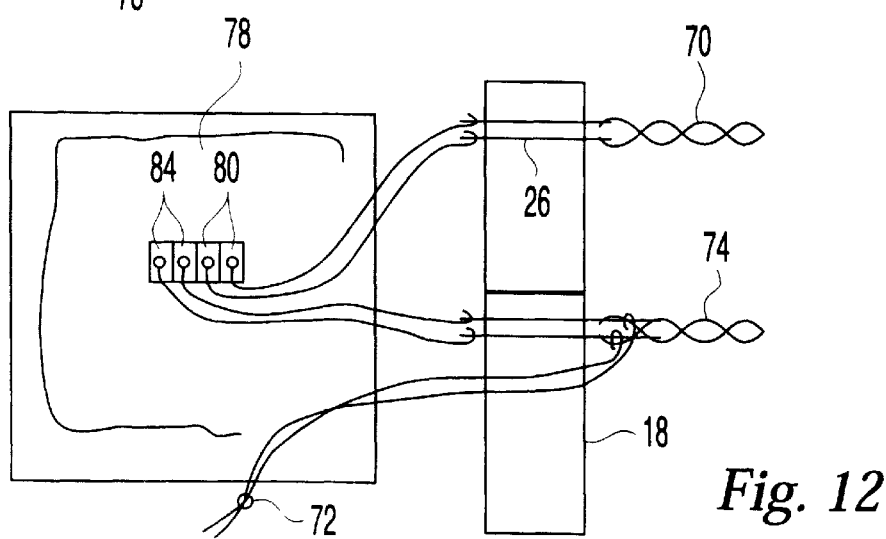
FIG. 12 is a diagram of a further alternative embodiment of connections for a splitter assembly of the present invention.

While FIG. 4 divides array 24 of terminals 26 into first, second and third fields, FIGS. 10–12 illustrate alternative embodiments where one field or two fields are used to connect circuit 78 into the cross-connect arrangement of the main distribution frame. With reference to FIG. 10, instead of bringing POTS line 70 and xDSL line 72 to terminal block 18, they may be routed directly to POTS contacts 80 and xDSL contacts 82, respectively, of splitter circuit 78 on card 40. Jumper contacts 84 are connected to a pair of terminals 26 of terminal block 18 and jumpers 74 are connected to such pair. Circuit 78 is still connected to one pair of terminals of a terminal block and as such is connected into the cross-connect arrangement. In this arrangement, front face 20 of terminal block 18 and its jumpers can remain essentially as is. It may be that certain POTS lines will be dedicated to xDSL service and therefore the xDSL splitter assembly of FIG. 10 may provide sufficient cross-connection ability for such lines.

With reference to FIG. 11, an arrangement that is an option for the terminal blocks of the second array that are connected to the outside plant cables is shown. In this arrangement, the POTS signal is carried by jumper 74a connected to a pair of terminals 26 in terminal block 18 and POTS contacts 84 are connected to such pair of terminals. Similarly, the xDSL signal is carried by jumper 74b connected to a pair of terminals in terminal block 18 and xDSL contacts 82 are connected to such pair of terminals. Outside plant contacts 85 are connected to outside plant line 75 and carry the combined signals between the subscriber and the central office. One possible variation on FIG. 11 is to have the xDSL line bypassing terminal block 18 to connect to xDSL contacts 82 as in FIG. 10.

FIG. 12 shows an embodiment that is a variation of FIG. 4 where the xDSL circuit does not have a high pass filter. It is possible that the xDSL circuit at the main distribution frame will only have a low pass filter to pass the POTS signals and the high pass filter to pass the xDSL signals remains at the xDSL modem. In this scenario, the circuit may only have two pairs of contacts 80 and 84 for the POTS and jumper connections, respectively. The xDSL line 72 may then be connected to the same terminals as jumpers 74. As such, the xDSL signal and POTS signal are combined at the cross-connect point.

As can be seen, two arrays of terminal blocks cross-connected by jumpers provides a number of possible permutations of connecting the xDSL splitter into the cross-connect arrangement with at least one of the pair of contacts of the splitter circuit connected to a pair of terminals on one of the terminal blocks to connect the circuit into the cross-connect field. While the diagrams appear to depict wire wrap connections, it should be understood that any connecting method may be used, for example, short connectorized jumpers, insulation displacement connectors, circuit card connectors, direct connection from the card to the terminal on the terminal block, etc.

Although the present invention has been described with respect to certain embodiments, it should be understood that various changes, substitutions and modifications may be suggested to one skilled in the art and its is intended that the present invention encompass such changes, substitutions and modifications as fall within the scope of the appended claims.

The invention claimed is:

1. A main distribution frame comprising:
    (a) a frame;
    (b) a first terminal block and a second terminal block mounted on the frame, the first terminal block comprising a first array of terminals for electrical connection of at least two wires and the second terminal block comprising a second array of terminals for electrical connection of at least two wires, at least one of the terminals of the first array electrically connected to at least one of the terminals of the second array by a jumper wire to create a cross-connect field; and
    (c) at least one xDSL splitter circuit electrically connected to the first terminal block, the xDSL splitter circuit comprising a first pair of contacts for electrical connection to a wire pair carrying a POTS signal, a second pair of contacts for electrical connection to a wire pair carrying an xDSL signal and a third pair of contacts for electrical connection to a wire pair carrying a combined signal comprising the POTS signal and the xDSL signal;
    wherein the first array of terminals defines a POTS field of terminals, an xDSL field of terminals and a jumper field of terminals and wherein at least one of the first pair of contacts, the second pair of contacts and the third pair of contacts are electrically connected to a pair of the terminals of the first array of terminals.

2. The main distribution frame of claim 1 wherein the xDSL splitter circuit is electrically connected between the third pair of contacts and the first pair of contacts to pass only the POTS signal to the wire pair carrying the POTS signal.

3. The main distribution frame of claim 1 wherein the xDSL splitter circuit is electrically connected between the third pair of contacts and the second pair of contacts to pass only the xDSL signal to the wire pair carrying the xDSL signal.

4. The main distribution frame of claim 1 wherein each of the first pair of contacts, the second pair of contacts and the third pair of contacts are electrically connected to a respective pair of terminals of the first array of terminals.

5. The main distribution frame of claim 1 wherein the first pair of contacts are electrically connected to a pair of terminals of the POTS field of terminals, the second pair of contacts are electrically connected to a pair of terminals of the xDSL field of terminals and the third pair of contacts are electrically connected to a pair of terminals of the jumper field of terminals.

6. The main distribution frame of claim 1 further comprising a housing attached to the frame for mounting the first terminal block and the xDSL splitter circuit thereon, the housing defining an interior and an opening to the interior, the first terminal block comprising a rear face adjacent the opening and a front face opposite the rear face, each of the terminals of the first array of terminals extending thorough the first terminal block such that the terminal has a front end accessible from the front face and a rear end accessible from the rear face.

7. The main distribution frame of claim 6 wherein the first pair of contacts are electrically connected to the rear ends of a pair of terminals of the POTS field of terminals and the front ends of the pair of terminals of the POTS field of terminals are electrically connected to the wire pair carrying the POTS signal, wherein the second pair of contacts are electrically connected to the rear ends of a pair of terminals of the xDSL field of terminals and the front ends of the pair of terminals of the xDSL field of terminals are electrically connected to the wire pair carrying the xDSL signal, and wherein the third pair of contacts are electrically connected to the rear ends of a pair of terminals of the jumper field of terminals.

8. The splitter assembly of claim 6 wherein the first terminal block is pivotally attached to the housing and movable between a closed position for providing access to the front face and an opened position for providing access to the rear face and to the interior of the housing.

9. A splitter assembly for mounting to a main distribution frame, comprising:
    (a) a housing;
    (b) a terminal block mounted on the housing, the terminal block comprising an array of terminals for electrical connection of at least two wires; and
    (c) at least one xDSL splitter circuit mounted on the housing and electrically connected to the terminal block, the xDSL splitter circuit comprising a first pair of contacts for electrical connection to a wire pair carrying a POTS signal, a second pair of contacts for electrical connection to a wire pair carrying an xDSL signal and a third pair of contacts for electrical connection to a wire pair carrying a combined signal comprising the POTS signal and the xDSL signal;
    wherein the array of terminals defines a POTS field of terminals, an xDSL field of terminals and a jumper field of terminals and wherein at least one of the first pair of contacts, the second pair of contacts and the third pair of contacts are electrically connected to a pair of the terminals of the array of terminals.

10. The splitter assembly of claim 9 wherein the xDSL splitter circuit is electrically connected between the third pair of contacts and the first pair of contacts to pass only the POTS signal to the wire pair carrying the POTS signal.

11. The splitter assembly of claim 9 wherein the xDSL splitter circuit is electrically connected between the third pair of contacts and the second pair of contacts to pass only the xDSL signal to the wire pair carrying the xDSL signal.

12. The splitter assembly of claim 9 wherein each of the first pair of contacts, the second pair of contacts and the third pair of contacts are electrically connected to a respective pair of terminals of the array of terminals.

13. The splitter assembly of claim 9 wherein the first pair of contacts are electrically connected to a pair of terminals of the POTS field of terminals, the second pair of contacts are electrically connected to a pair of terminals of the xDSL field of terminals and the third pair of contacts are electrically connected to a pair of terminals of the jumper field of terminals.

14. The splitter assembly of claim 9 wherein the housing defines an interior and an opening to the interior and wherein the terminal block comprises a rear face adjacent the opening and a front face opposite the rear face, each of the terminals of the array of terminals extending thorough the terminal block such that the terminal has a front end accessible from the front face and a rear end accessible from the rear face.

15. The splitter assembly of claim 14 wherein the first pair of contacts are electrically connected to the rear ends of a pair of terminals of the POTS field of terminals and the front ends of the pair of terminals of the POTS field of terminals are electrically connected to the wire pair carrying the POTS signal, wherein the second pair of contacts are electrically connected to the rear ends of a pair of terminals of the xDSL field of terminals and the front ends of the pair of terminals of the xDSL field of terminals are electrically connected to the wire pair carrying the xDSL signal, and wherein the third pair of contacts are electrically connected to the rear ends of a pair of terminals of the jumper field of terminals.

16. The splitter assembly of claim 14 wherein the terminal block is pivotally attached to the housing between a closed position for providing access to the front face and an opened position for providing access to the rear face and the interior of the housing.

17. A splitter assembly for connecting an xDSL splitter circuit into a cross-connect arrangement, the splitter assembly comprising:

(a) a housing;

(b) a terminal block mounted on the housing and comprising an array of terminals; and (c) at least one xDSL splitter circuit mounted on the housing and electrically connected to the terminal block, the xDSL splitter circuit comprising a first pair of contacts, a second pair of contacts and a third pair of contacts;

wherein the array of terminals defines a POTS field of terminals, an xDSL field of terminals and a jumper field of terminals and wherein the first pair of contacts are electrically connected to a pair of terminals of the POTS field of terminals, the second pair of contacts are electrically connected to a pair of terminals of the xDSL field of terminals and the third pair of contacts are electrically connected to a pair of terminals of the jumper field of terminals.

18. The splitter assembly of claim 17 wherein the housing defines an interior and an opening to the interior and wherein the terminal block comprises a rear face adjacent the opening and a front face opposite the rear face, each of the terminals of the array of terminals extending thorough the terminal block such that the terminal has a front end accessible from the front face and a rear end accessible from the rear face.

19. The splitter assembly of claim 18 wherein the first pair of contacts are electrically connected to the rear ends of a pair of terminals of the POTS field of terminals and the front ends of the pair of terminals of the POTS field of terminals are electrically connected to a wire pair carrying a POTS signal, wherein the second pair of contacts are electrically connected to the rear ends of a pair of terminals of the xDSL field of terminals and the front ends of the pair of terminals of the xDSL field of terminals are electrically connected to a wire pair carrying an xDSL signal, and wherein the third pair of contacts are electrically connected to the rear ends of a pair of terminals of the jumper field of terminals.

20. The splitter assembly of claim 18 wherein the terminal block is pivotally attached to the housing between a closed position for providing access to the front face and an opened position for providing access to the rear face and the interior of the housing.

\* \* \* \* \*